G. A. AMBLER.
MACHINE FOR INSERTING SLUGS OR FASTENINGS IN STOCK.
APPLICATION FILED AUG. 31, 1901.

976,837.

Patented Nov. 29, 1910.

Witnesses:
Fred S. Greenleaf.
Edward F. Allen.

Inventor
George A. Ambler,
by Crosby & Gregory
Attys.

G. A. AMBLER.
MACHINE FOR INSERTING SLUGS OR FASTENINGS IN STOCK.
APPLICATION FILED AUG. 31, 1901.

976,837.

Patented Nov. 29, 1910.

Witnesses:
Fred L. Greenleaf.
Edward H. Allen.

Inventor.
George A. Ambler,
by Crosby Gregory
attys

G. A. AMBLER.
MACHINE FOR INSERTING SLUGS OR FASTENINGS IN STOCK.
APPLICATION FILED AUG. 31, 1901.

976,837.

Patented Nov. 29, 1910.
6 SHEETS—SHEET 3.

Witnesses:
Fred S. Greenleaf
Edward F. Allen

Inventor
George A. Ambler,
by Crosby & Gregory
Attys.

G. A. AMBLER.
MACHINE FOR INSERTING SLUGS OR FASTENINGS IN STOCK.
APPLICATION FILED AUG. 31, 1901.

976,837.

Patented Nov. 29, 1910.

Witnesses:
Fred S. Greenleaf
Edward F. Allen

Inventor.
George A. Ambler,
By Crosby Gregory
Attys.

G. A. AMBLER.
MACHINE FOR INSERTING SLUGS OR FASTENINGS IN STOCK.
APPLICATION FILED AUG. 31, 1901.

976,837.

Patented Nov. 29, 1910.

UNITED STATES PATENT OFFICE.

GEORGE A. AMBLER, OF NEWARK, NEW JERSEY, ASSIGNOR TO UNITED SHOE MACHINERY COMPANY, OF PATERSON, NEW JERSEY, AND BOSTON, MASSACHUSETTS, A CORPORATION OF NEW JERSEY.

MACHINE FOR INSERTING SLUGS OR FASTENINGS IN STOCK.

976,837. Specification of Letters Patent. Patented Nov. 29, 1910.

Application filed August 31, 1901. Serial No. 74,036.

*To all whom it may concern:*

Be it known that I, GEORGE A. AMBLER, a citizen of the United States, residing at Newark, in the county of Essex and State of New Jersey, have invented an Improvement in Machines for Inserting Slugs or Fastenings in Stock, of which the following description, in connection with the accompanying drawings, is a specification, like letters on the drawings representing like parts.

This invention has for its object the production of an improved machine for inserting slugs or fastenings.

The machine is arranged to drive either two rows or one row of slugs or fastenings, as may be desired, and one of the important features of my invention is mechanism wherethrough the operator may change from one row to two rows or from two rows to one row without stopping the machine.

The specific construction in which this invention is embodied in the machine herein shown and described consists of wheels for feeding a plurality of wires in combination with a plurality of shields and controlling mechanism whereby the feed of one of the wires may be prevented or permitted according as one or two rows of slugs are to be inserted.

While the invention is herein shown as applied to a machine for driving either one or two rows of slugs, it will be obvious that it is equally applicable to a machine arranged to drive more than two rows and the mechanism herein shown could easily be arranged to afford such choice or choices as to the number of rows to be inserted as may be desired by the operator.

Other features of my invention will be pointed out in the claims.

Fig. 6$^a$ is a view on a smaller scale, showing the face of the head with the gibs and saddle block and the driver block and its cap detached.

The frame work is represented as composed of a column A sustained on a suitable base A', and a head $A^2$ fastened to the column and having suitable bearings to sustain the main shaft $A^3$.

The front end of the main shaft has connected with it a cam disk $a$ having a stud $a'$ over which is fitted a link $a^2$ connected with the driver bar $a^3$, the latter being fitted to slide in ways behind gibs $a^4$ secured to the head of the machine by screws $a^5$.

Figures 7, 8, 9, 10, 11, 12, 13, 14, 15, 16, 17, 18:
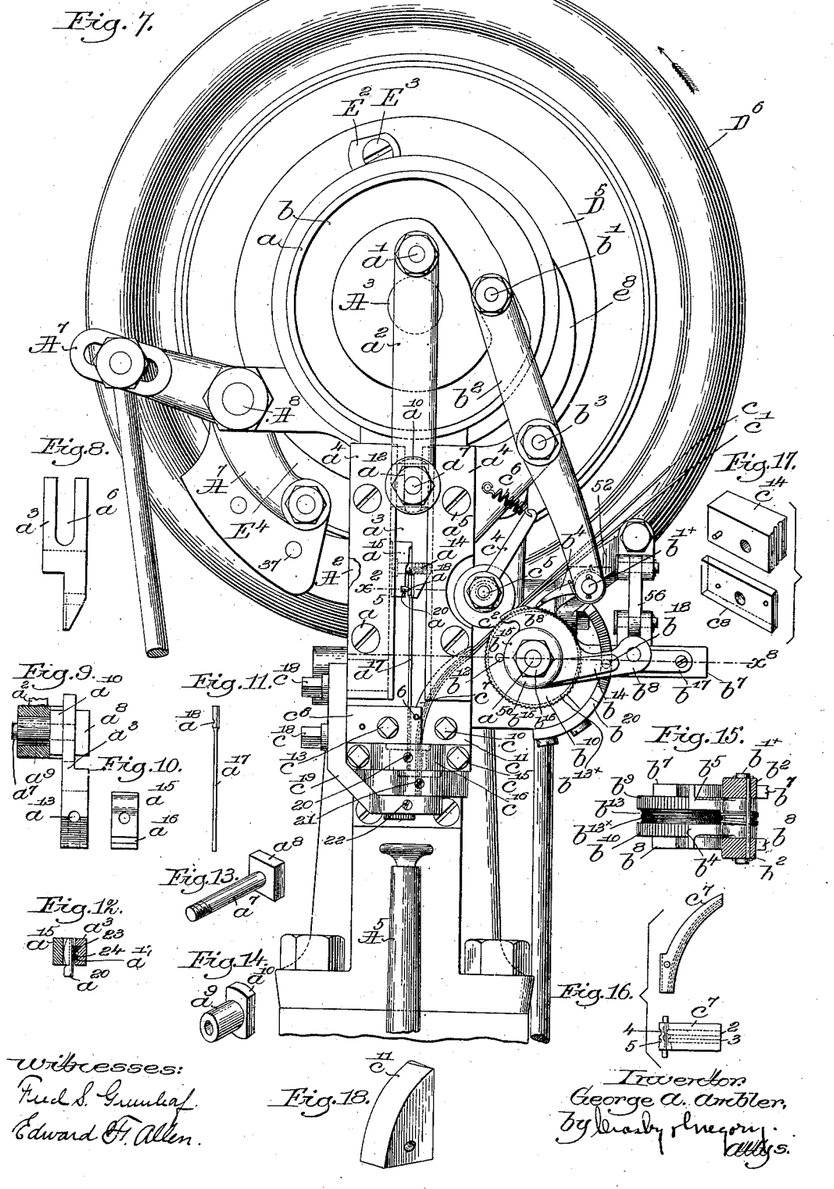
Fig. 7 is a partial front elevation enlarged of the upper portion of the machine.
Fig. 8 shows a face view of the driver bar detached.
Fig. 9 shows the driver bar and part of the means for holding the same frictionally, the section lines showing the lower end of the link.
Fig. 10 shows an inner side view of the driver clamp detached.
Fig. 11 shows the driver in elevation.
Fig. 12 is a cross section in the line $x^2$, Fig. 7, showing the key locking the drivers in their operative position.
Figs. 13 and 14 show detached the parts employed to clamp the driver frictionally.
Fig. 15 is a section through the common actuator carrying the two pawls; the figure also showing the feed wheels and their connected ratchet wheels and shields.
Fig. 16 is a detail showing detached the curved guide employed to direct the drivers and the wire.
Fig. 17 is a detail showing the block forming part of the driver guide and its cap plate.
Fig. 18 shows the saddle block $c^{11}$ detached.

The upper end of the driver bar, shown detached in Fig. 8, has a slot $a^6$ which is entered by a threaded rod $a^7$, see Figs. 9 and 13, said rod having at one end a block $a^8$.

The hole made in the end of the link $a^2$ receives in it a sleeve $a^9$ having at one end a plate $a^{10}$.

The rod $a^7$ is extended through the sleeve $a^9$ in a direction to leave the block $a^8$ at the rear side of the driver bar; the link $a^2$ is placed over the said sleeve and a suitable nut $a^{12}$, see Fig. 7, is applied to the threaded rod. With the driver between the block and the plate the nut may be turned on the rod acting against the end of the sleeve and the driver bar will thereby be clamped frictionally between the block and plate.

The nut $a^{12}$ may be loosened to unclamp the bar, so that it may be adjusted vertically into any desired position according to the work to be done.

The driver is held in position on the driver-bar by a clamping plate $a^{15}$ provided with a hole and a groove $a^{16}$. A screw $a^{14}$ is inserted loosely through the hole in the clamping-plate and extends into a threaded hole $a^{13}$ in the driver-bar, as shown in Fig. 7.

Viewing Fig. 11, showing one of the drivers, the upper end thereof is represented as provided with a notch $a^{18}$, adapted to be entered by a key $a^{20}$, shown best in Fig. 12, inserted in the groove $a^{16}$ of the clamp $a^{15}$ and acting to clamp the upper ends of the drivers firmly in working position.

One side of the key, see Fig. 12, in contact with the bottom of the groove $a^{16}$, is convexed to thereby enable said key to adapt itself to any variations in diameter of the drivers where the key contacts therewith.

In case of any obstruction offered to the drivers which would injure them or the machine, the driver bar, owing to its frictional connection with the actuating link $a^2$, may slip, and thus avoid breaking of the parts.

The invention described specifically with relation to the drivers is also applicable to holding awls, and by the term "driver bar" and "drivers" used in the claims, I mean also to include an awl bar and awls respectively.

The face of the disk $a$ is provided with a groove $b$ which receives in it a roller or other stud $b'$ carried by a lever $b^2$ pivoted at $b^3$ on an ear or projection extended from the head, see Fig. 7, said lever, hereinafter designated as a common actuator, being provided with two spring-pressed pawls $b^4$, $b^5$, represented as mounted upon one pin $b'^x$.

Figure 29:
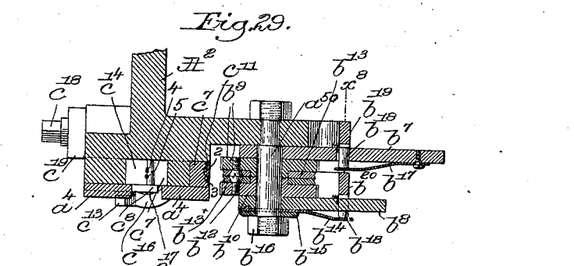
Fig. 29 is a sectional detail of the wire feeding means in the line $x^8$ of Fig. 7.
Figure 30:
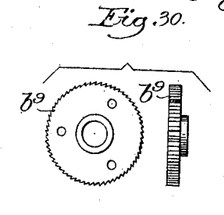
Fig. 30 shows in two views one of the ratchet wheels of the wire feeding mechanism.
Figure 31:
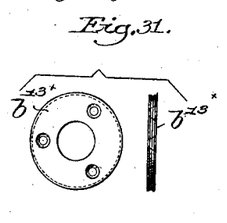
Fig. 31 shows in two views one of the wire feeding wheels.
Figure 32:
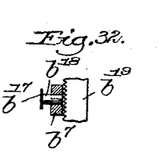
Fig. 32 is a sectional detail of one of the shields and its locking pin engaging the teeth of a stationary rack.

The stud $a^{50}$ is fixed on the head $A^2$, see Figs. 7 and 29. This stud receives upon it two shields $b^7$, $b^8$, the shield $b^8$ being shown detached in Fig. 34. Between these two shields the stud is surrounded loosely by two ratchet wheels $b^9$, $b^{10}$, each ratchet wheel having secured to it by suitable screws $b^{12}$ like feed wheels $b^{13}$, $b^{13x}$.

The stud $a^{50}$ see Fig. 29 has applied to it outside the shield $b^8$ a spring $b^{14}$, a washer $b^{15}$ and a nut $b^{16}$. The shield $b^7$ has connected with it a spring $b^{17}$. The springs $b^{14}$ and $b^{17}$ each act upon a like locking stud $b^{18}$, and the inner end of each stud coacts with suitable ratchet teeth on the sides of the plates $b^{19}$ and $b^{20}$ fixed to the head of the machine.

Figure 34:
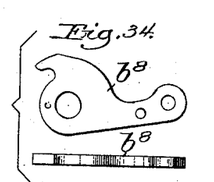
Fig. 34 shows two views of one of the shields detached.
Figure 35:
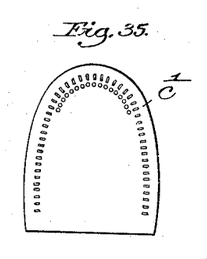
Fig. 35 shows a tread lift of a heel having slugs inserted therein as they may be in accordance with my invention.

The shape of the shield $b^8$ is shown best in Fig. 34, and shield $b^7$ is similarly shaped except that it has a handle extending to the right, see Figs. 7 and 29, to be engaged by the operator. The projections, see Fig. 15, extended from the sides of the pawls $b^4$ and $b^5$ near their free ends, rest normally upon the upper sides of the shields, and by moving the shields the effective length of the stroke of each pawl in actuating its feed wheel may be regulated to control the distance that the wire is fed.

According to my present invention each shield is made operative at the end of the stroke of the pawl instead of at the beginning of the stroke, as has been the practice in machines of this class as heretofore constructed. I find that a more uniform and accurate stroke of the wire feeding mechanism is secured by this construction in which each pawl is made to engage its ratchet wheel always at the same point, the length of the feeding stroke being varied by positioning the shield to disengage the pawl from the ratchet wheel at the proper point to insure the length of slug desired, and this is an important feature of my invention. By changing the positions of these shields not only may the length of the wire fed be controlled, but also one wire may be fed for a greater distance than the other, or the feeding of one wire may be entirely suspended.

The shield $b^7$ controlling the pawl $b^5$ for moving the feed wheel $b^{13}$ is shown as adjustable by hand. The position of shield $b^8$ may be adjusted to vary the length of wire fed by the wheel $b^{13x}$ or to prevent any wire being fed by said wheel by a manually controlled lever, in this instance shown as a knee lever 50, pivoted at 51 on an ear extended from the column A. The lever 50 is joined with a lever 52 by suitable connections shown as a link 53, elbow lever 54 and a link 55. The front end of lever 52 is connected with the end of the shield $b^8$ by a jointed or flexible link 56. By means of this manually controlled mechanism it is possible to change from one row to two or from two rows to one without stopping the machine, and this is one of the most important features of my invention.

The lever 50 has an adjustable regulator 57 which when the lever is turned to put the regulator in contact with a stop 58 insures the feeding of the wire $c$ for the longest slug or fastening, and by moving the lever 50 in the opposite direction the feeding of wire $c$ may be entirely suspended.

Figure 33:
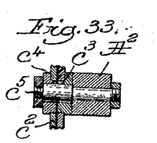
Fig. 33 a sectional detail showing the wire pressure wheels and their supporting means.

The wires $c$, $c'$, sustained in suitable manner by reels, and being of any desired shapes in cross section according to the shapes desired for the slugs or fastenings, are led into the machine, and each wire is held against its proper feed wheel by pressure wheels $c^2$, each mounted upon an eccentric hub $c^3$, see Fig. 33, extended from a lever $c^4$, mounted upon a stud $c^5$, the eccentric of each lever sustaining its own pressure roller. Suitable springs $c^6$ are connected with the ends of said levers, and act normally to keep the pressure rollers in contact with the upper sides of the wire.

Figure 6:
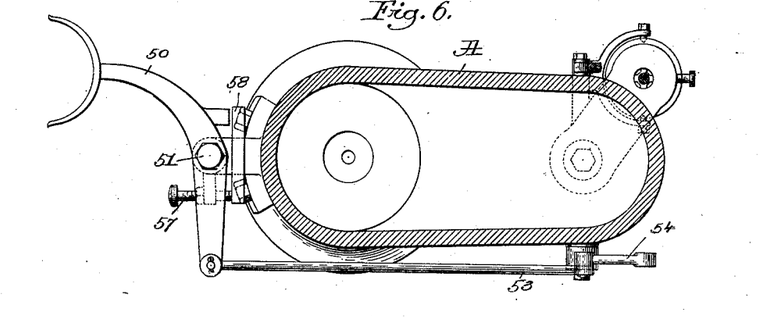
Fig. 6 is a section in the irregular dotted line $x'$, Fig. 1.
Figure 6A:
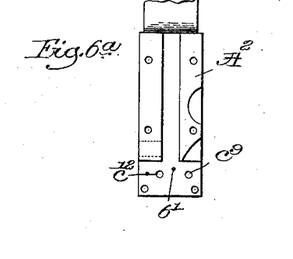

The front face of the head is cut away, see Fig. 6$^a$, to leave a space for the reception of a guide block $c^7$, having a concave underside provided with a series of grooves 2, 3, see Fig. 16, for the reception of the two wires. The opposite face of said guide block is substantially vertical, and is provided with two grooves 4, 5, which form part of a suitable guideway for the drivers. This block is held in position by means of a suitable dowel pin 6 which, see Fig. 7, extended through said block enters a hole 6' made in the head, said dowel pin extending forwardly from the face of said guide block to receive over it the cap plate $c^8$.

The face of the head has a hole $c^9$ which receives a bolt $c^{10}$ extended loosely through a hole in a saddle block $c^{11}$, having a convex face to underlie the concaved face of the guide block $c^7$ and sustain the wires on their way into the machine.

The saddle block may be adjusted with relation to the guide block $c^7$ to provide for differences in thickness of the wire, and the guide block may be changed and another guide block having any desired shapes of grooves inserted in its place. The head of the machine has also a threaded hole $c^{12}$ to receive a bolt $c^{13}$ which after being extended through said cap plate is extended loosely through a guide block $c^{14}$ having at its right hand end, see Figs. 7, 17 and 29, suitable grooves for directing the drivers in their movement.

The face of the head has connected with it by suitable bolts $c^{15}$ a yoke $c^{16}$, represented as provided with a circular hole in which is supported a multi-part cutter or block $c^{17}$, held in position by set screw 20, the contiguous faces of each part of said block being grooved as at 7, 8, to receive the drivers. One part of said block, see Figs. 19, 20 and 25, has two additional holes 9, 10, each properly shaped to receive respectively the wires $c$ and $c'$, the wire $c'$ being herein represented as quadrilateral in shape, while the wire $c$ is represented as round.

The head of the machine has connected with it by suitable bolts $c^{18}$ a foot plate $c^{19}$ sustaining a throat 11, shown as composed of two parts, the contiguous face of each part having suitable grooves through which the slugs or fastenings and the drivers may pass in the act of driving a slug or fastening.

Figure 21:
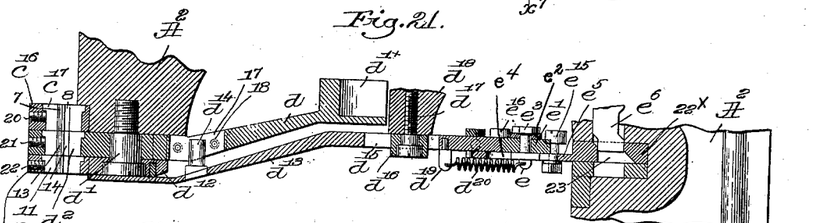
Fig. 21 is a section in the line $x^4$, Fig. 20.
Figures 22, 23, 24, 25, 26, 27, 28:
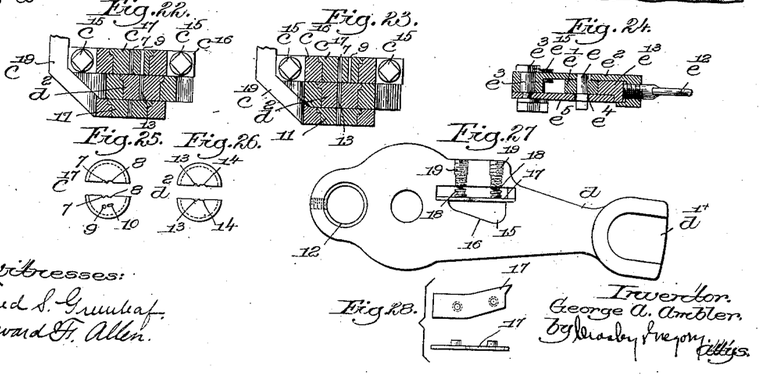
Fig. 22 is a section through the cutters, in the line $x^5$, Fig. 19.
Fig. 23 is a like section in the dotted line $x^6$, Fig. 20.
Fig. 24 is a section in the line $x^7$, Fig. 20.
Fig. 25 shows the upper cutter detached and its two parts separated.
Fig. 26 shows the lower cutter detached.
Fig. 27 shows detached the lever for actuating the lower cutter.
Fig. 28 shows the plate 17 detached from the lever, shown in Fig. 27.

Intermediate the yoke $c^{16}$ and foot plate, I have interposed a lever $d$, shown detached in Fig. 27, said lever being mounted to freely turn about a stud $d'$, see Fig. 21, inserted in the bottom of the head.

The lever $d$ has at one end a shouldered pocket 12 in which is sustained a cutter block $d^2$, the block being held by a screw 21. The block as shown in Fig. 26 is composed of a plurality of parts, the meeting faces of said parts having respectively suitable grooves as 13, 14, to receive ends of the wires.

Figure 19:
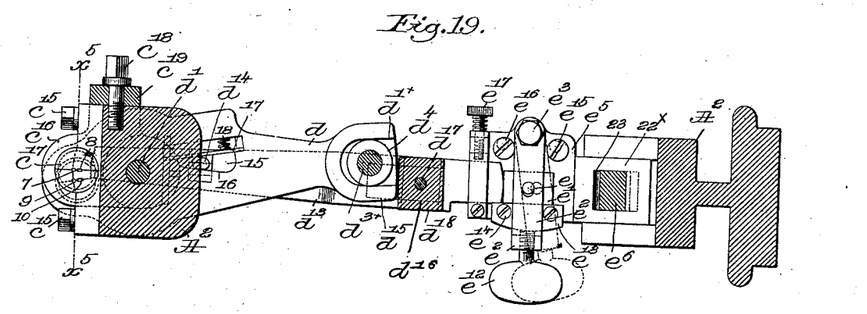
Fig. 19 is an enlarged section below the dotted line $x^3$, Fig. 1, showing the cutters in position to receive the slug material.
Figure 20:
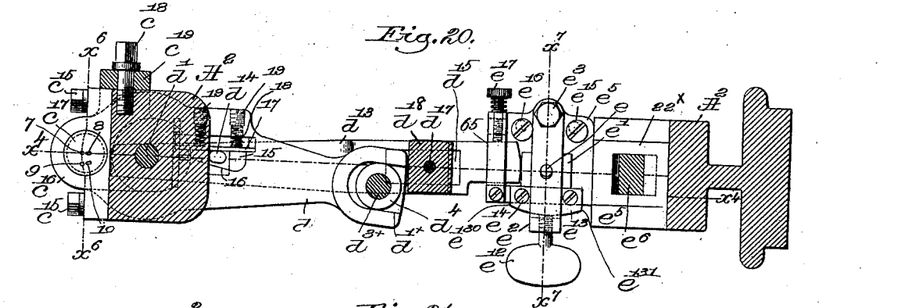
Fig. 20 is a like section with the cutters in position to enable the wire to be driven therefrom into the stock.

The wires having been inserted in the passages 13, 14, while the lever is in position Figs. 19 and 22, the lever is moved to the left into the position Figs. 20 and 23, such movement of the lever and the cutter or block $d^2$ severing the wires between the upper surface of said cutter and the underside of the cutter or block $c^{17}$. The lever is moved far enough to place the passages 13, 14, containing the slugs or fastenings in line with the openings 7 and 8, after which the driver descends, meets the slugs or fastenings in the undermost cutter $d^2$, and drives said slugs or fastenings through the passages in the throat 11 into the stock supported by the horn. Throat 11 is a counterpart of the block $d^2$ and is held in position by set screw 22.

Figures 1, 2, 3, 4:
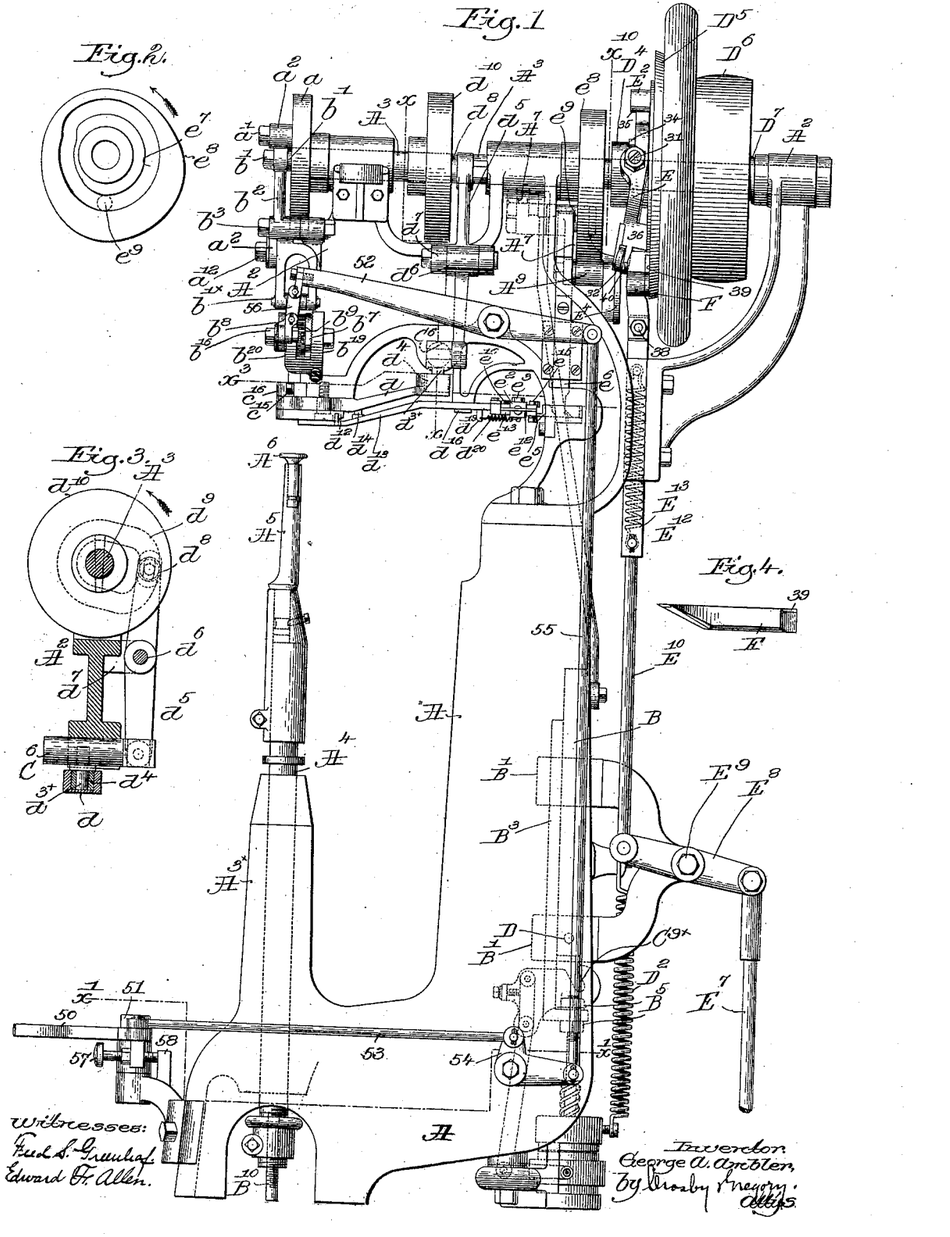
Figure 1 is a partial right hand side elevation of a machine embodying my present invention in one of the best forms now known to me.
Fig. 2 in side elevation shows the cam for moving the lever instrumental in depressing the horn, said cam also actuating the shoe feeding device.
Fig. 3 is a section in the irregular line $x$, Fig. 1.
Fig. 4 is a plan view of the block F chiefly to show its tapered or wedge-shaped end.
Figure 5:
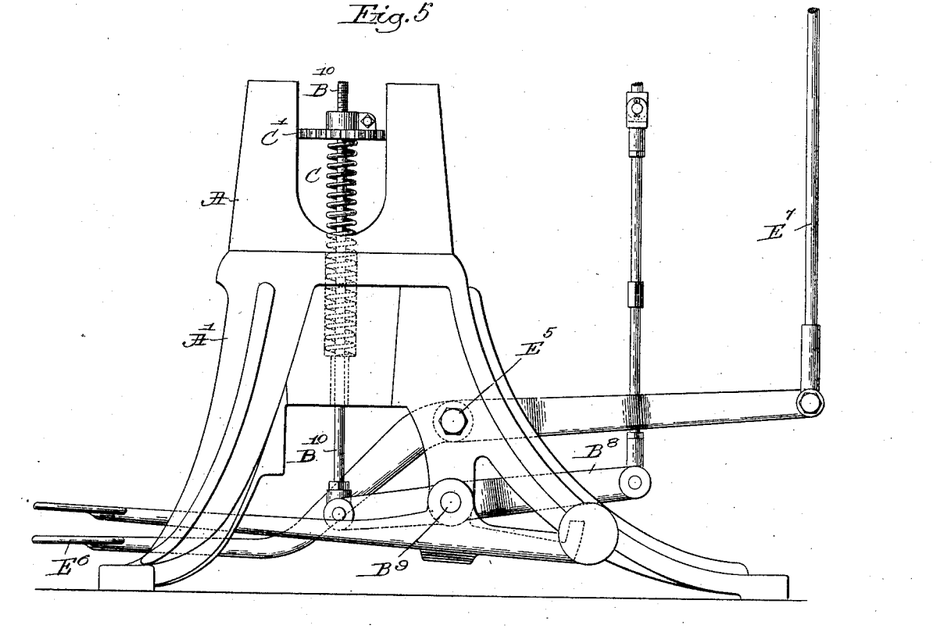
Fig. 5 shows in side elevation the lower part of the machine omitted from Fig. 1.

To move the lever $d$ to actuate the cutter $d^2$, I have provided the inner end of said lever, as herein shown, with a space $d'^\times$ in which enters a roller or other stud $d^4$, see Figs. 19 and 20, free to rotate about a stud $d^{3\times}$ extended downwardly from a slide rod $c^6$, see Fig. 3, actuated by a lever $d^5$ connected therewith at its lower end and mounted upon an eccentric arbor $d^6$ see Figs. 1 and 3 held in suitable ears $d^7$ sustained by the head $A^2$.

The upper end of the lever $d^5$ has connected with it adjustably a roller stud $d^8$ which runs in a groove $d^9$ of a cam $d^{10}$ fast on the main shaft $A^3$.

The adjustment of the roller stud $d^8$ on the lever $d^5$ provides for increasing or diminishing the throw of the lever $d^5$, and consequently the extent of movement imparted to the lever $d$.

By adjusting the eccentric arbor $d^6$ the extreme points of the throw of the lever $d^5$, and consequently the lever $d$, may be determined to insure that the respective holes 13 and 14 in the cutter $d^2$ register alternately with the holes 7, 8, and 9, 10.

The lever $d$ has a slot 15, see Fig. 27, of unequal width, one side wall 16 of said slot being inclined, the other side wall of said slot being straight, the straight side being constituted preferably by a plate 17 backed up by springs 18, the strength of which may be regulated by adjusting screws 19, said plate being hereinafter referred to as a compensating device.

The screw $d'$ is extended through a plate $d^{12}$, see Fig. 21, which enters a recess in the foot plate, and thereby aids in positioning the foot-plate correctly.

The shoe feeding device is composed of a lever $d^{13}$ provided with an upright stud $d^{14}$ which enters the slot 15 in the lever $d$. The shoe feeding lever $d^{13}$ has a slot $d^{15}$, see Fig. 21, which receives in it a loosely mounted swiveling block $d^{16}$ held by a stud screw $d^{17}$, inserted in a projection $d^{18}$, depending from the head $A^2$. The swiveling block $d^{16}$ constitutes a fulcrum for the feeding lever $d^{13}$.

The lever $d^{13}$ has an attached stud $d^{19}$ to which is connected a spring $d^{20}$. The opposite end of said spring is connected with a stud $e$ carried by a block $e'$, the upper end of said stud, see Figs. 19 and 20, entering loosely a hole in a lever $e^2$ pivoted at $e^3$, the lower end of said stud entering and being free to move in a slot $e^4$ in the underside of a carriage $e^5$ having its rear end $22^x$ extended in a suitable slot or guideway cut in the head $A^2$, see Fig. 21. The rear end of said carriage has a slot 23 provided with cam faced ends, see Fig. 21 and said slot is entered by a cam shaped leg $e^6$ which derives its movement of reciprocation from a cam groove $e^7$ see Fig. 2, made in the face of a cam $e^8$ secured to the main shaft, a roller or stud $e^9$, see Fig. 1, connected with said leg entering said groove.

The spring $d^{20}$ acts to keep the inner end of the lever $d^{13}$ in contact with the block $e'$, and by moving the lever $e^2$ the lever $d^{13}$ may be moved longitudinally to thereby place its toothed acting end, see Fig. 20, at the proper distance from the driver passages to insure that the slugs or fastenings be inserted in the stock at the desired distance from its edge.

The pivoted lever $e^2$ has an adjusting device $e^{12}$, shown as a set screw the end of which acts against a plate $e^{13}$ having its acting face eccentric to the fulcrum $e^3$ of lever $e^2$, said plate being connected with the carriage $e^5$ by suitable screws $e^{14}$. The distance of the acting face of plate $e^{13}$ from the center of pivot $e^3$ is greater at $e^{131}$ than at $e^{130}$, and increases gradually from $e^{130}$ to $e^{131}$, so that as soon as the set screw contacts with said surface at any point effectual resistance is afforded against any backward movement of the feed lever.

To provide for positioning the front end of the feeding lever $d^{13}$ to effect a quick change in the distance of the nails from the edge of the stock, I have provided the carriage $e^5$ with two eccentric stops $e^{15}$ and $e^{16}$ which may be adjusted to limit the movement of the lever $e^2$ and control the distance of the fastenings from the edge of the stock.

The movement of the inner end of the lever $d^{13}$ is controlled by an adjusting device $e^{17}$. When the adjusting device occupies the position Fig. 20, the feeding device will have its shortest stroke and the slugs or fastenings will be driven close together. Turning the screw $e^{17}$ outwardly will allow an increase of lateral movement of the lever $d^{13}$, and consequently space the slugs or fastenings farther apart.

Feeding movement is imparted to the feeding lever by the contact of the inclined side 16 of slot 15 in lever $d$ with the stud $d^{14}$ extending upwardly from the feeding lever. The movement of the lever $d$, carrying the cutter from the position Fig. 20 into the position Fig. 19 actuates the feeding device, and the reverse movement of lever $d$ returns the feeding device to its starting position through pressure of plate 17 on stud $d^{14}$. The amount of this return movement depends on the position of regulating screw $e^{17}$. After the inner or right hand end, viewing Figs. 19 and 20, of lever $d^{13}$ meets screw $e^{17}$, then in the further movement of lever $d$ the springs 18 yield to pressure of stud $d^{14}$ on plate 17. Such an arrangement is necessary because movement of lever $d$ is uniform, while movement of lever $d^{13}$ must vary according to the spacing desired for the nails.

The shoe feeding lever $d^{13}$ must be adjusted longitudinally at times according to the distance it is desired to insert the slugs or fastenings from the edge of the material, and the adjustment of said lever carries with it the stud $d^{14}$ in the enlarged slot 15 see Fig. 20 of the lever $d$, which is inclined, as shown, to afford a uniform movement for the end of the feeding lever whatever be the distance of stud $d^{14}$ from the pivot $d^{17}$ of lever $d^{13}$.

The longitudinal movement of the feed lever $d^{13}$ that its toothed end may engage the stock preparatory to moving said feed-lever laterally to feed the stock, and to move the lever longitudinally in the opposite direction at the completion of the feeding-stroke to cause the toothed end of the lever to retire from the stock, is effected by the cam leg $e^6$, see Fig. 21, its cam portions contacting with the inclined end walls of the slot 23, said cam leg being moved downwardly to effect the engagement of the toothed end of the feed-lever with the stock, and upwardly to enable the toothed end of said lever to retire from the stock. This feed lever has imparted to it the usual four motions common to sewing machine feeding devices, and from the foregoing description must be readily understood.

The column A has erected upon it a sleeve $A^{3x}$ which receives a horn shaft $A^4$ carrying a horn $A^5$ of any suitable character, the horn shown being provided with an anvil tip $A^6$. The horn shaft $A^4$ is depressed automatically after driving each slug or fastening to thereby relieve the stock that it may be fed over the horn by or through a suitable lever as $A^7$ pivoted at $A^8$, see Fig. 7, provided with a roller or other stud $A^9$ which is acted upon at each revolution of the shaft $A^3$ by the periphery of the cam $e^8$ before described.

The lever $A^7$ has connected with it a link $A^{10}$ deriving its movement, as shown and described in divisional application Se. No. 289,160, filed on the 27th day of November A. D. 1905. In practice the stock-support or horn must be locked so that it cannot yield while a slug or fastening is being driven into the stock clamped between the horn and the usual foot-plate, and a slug or fastening having been driven, the horn must be depressed for feeding the stock. This may and preferably will be done as fully described in said divisional application.

The main shaft $A^3$ has secured to it in suitable manner the hub $D^4$ of a fast pulley $D^5$ having a conical face, and the shaft is driven at the desired times by or through a continuously moving pulley $D^6$ loose on the shaft, a suitable spring as $D^7$ acting through a collar $D^8$ to force the loose pulley toward and to engage the fast pulley frictionally.

That the loose pulley may be freed from its engagement with the fast pulley, I have herein shown the loose pulley as mounted upon a sleeve $D^9$ having a plate $D^{10}$ which plate is acted upon at suitable times, as when it is desired to release the loose pulley and stop the machine, by suitable studs $D^{12}$ free to be slid in holes made in the fast pulley. The sleeve, its plate $D^{10}$, and the pins are not, however, herein claimed.

Figure 36:
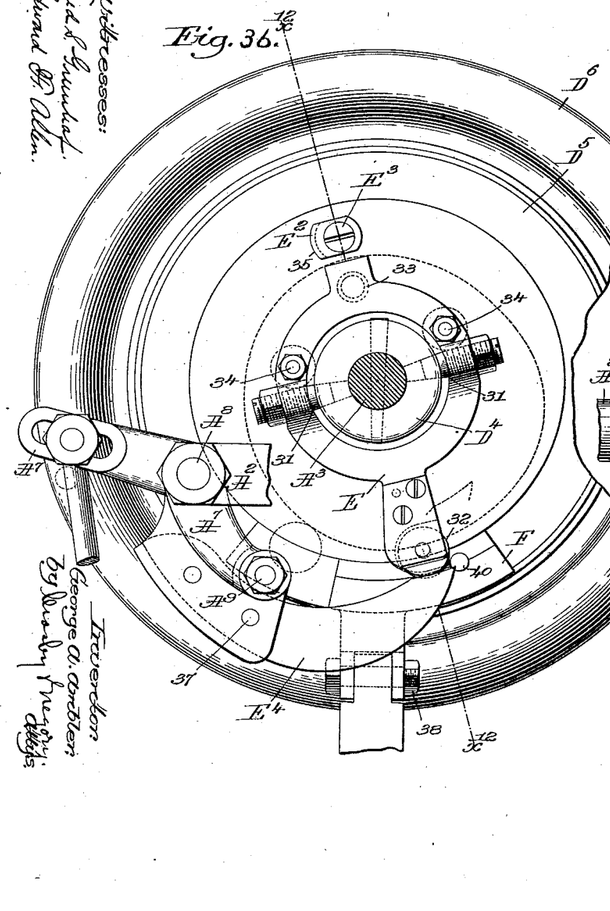
Fig. 36 is a section on an enlarged scale to the right of the dotted line $x^{10}$, Fig. 1.

The hub $D^4$ of the fast pulley is provided as shown with suitable conical openings, see Fig. 36, in which enter the conical points of pivot screws 31 carried by a controller E made as a lever and represented as shaped to surround the shaft $A^3$. One end of the controller is shown as provided with a roller 32, while the other end is provided with a spring 33, one end of the spring entering preferably as shown a recess in one side of the fast pulley $D^5$.

The controller has connected with it suitable stud screws 34 which when the pressure of the spring 33 is overcome in the movement of the controller meet the ends of the studs $D^{12}$ forcing the loose pulley away from the fast pulley. If at this time it should be desired to turn the shaft $A^3$ by hand, the attendant will turn the device $E^2$ having the lip 35 mounted on the stud screw $E^3$, from its full line position Fig. 36 into its dotted line position Fig. 37. The controller is provided with a projection 36 which enters the slot 30 and constitutes a guide to obviate twisting strain on the pivot pins 31.

The machine herein described is represented as provided with means whereby the horn may be depressed farther than for feeding to enable the work to be readily removed from the horn when the machine is stopped, and also to be readily applied to the horn before the machine is started.

The controller E referred to rotates with the fast pulley, and is also swung about the pivot pins 31. The controller is used to effect the lowering of the horn into its lowest position.

Figure 37:
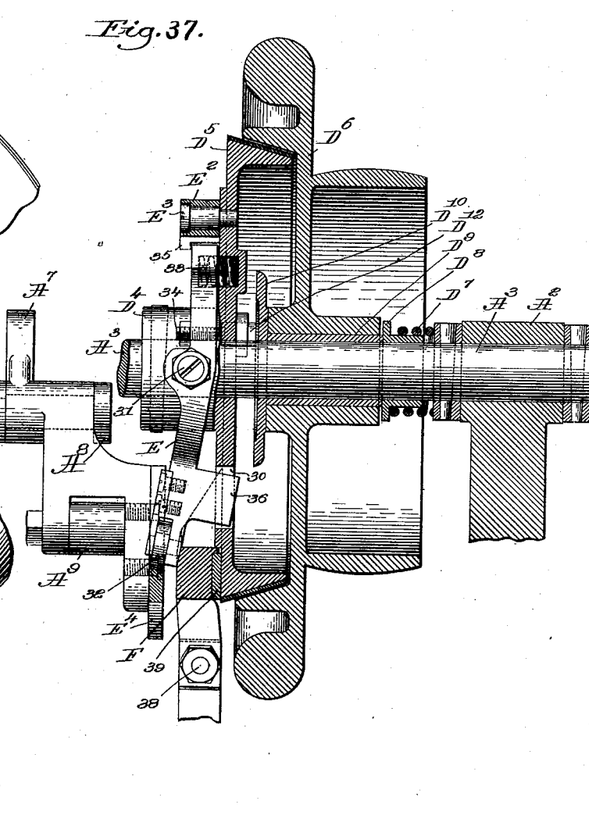
Fig. 37 is a section of the parts shown in Fig. 36 on the dotted line $x^{12}$.

I have provided one arm of the lever $A^7$ with an extension with which I have connected by bolts 37 a steel plate $E^4$, shown best in Figs. 36 and 37, said plate having a cam-shaped top.

The foot $A'$ of the machine has pivoted upon it at $E^5$ a suitable starting and stopping lever $E^6$ having jointed to its inner end a rod $E^7$ in turn connected with one end of a lever $E^8$, pivoted at $E^9$ and having connected with its opposite end a rod $E^{10}$ in turn connected at its upper end, see Fig. 1, with a slide $E^{12}$.

The rod and slide are normally kept elevated by a suitable spring $E^{13}$. The upper end of the slide has pivotally mounted upon a pin 38 carried thereby a rocking wedge F. The wedge, see Figs. 1 and 4, is tapered at one side, and has applied to its opposite face, as shown, friction material 39, which may be leather, to contact with the inner side of the fast pulley and act as a brake.

The block F has a stop 40, see Fig. 36, which acts to arrest the controller in a defined position when stopping the machine, and when putting the horn into its lowest position.

The parts are shown in Figs. 1, 36 and 37 in the position they will occupy when the machine is stopped and the horn is in its lowest position.

If the machine were running, and slugs or fastenings were being driven, the operator would have his foot on the starting treadle E⁶, which would lower the wedge block F so that it would be removed from contact with the fast pulley, and the spring 33 acting on the controller would turn the same into such a position that in the rotation of the controller with the fast pulley its roller would not contact with the extension E⁴.

When the operator desires to stop the rotation of the shaft A³ and put the horn into its lowest position, he removes his foot from the treadle E⁶, and the spring E¹³ immediately lifts the block F into the position shown in Figs. 36 and 37, and the lower end of the controller as soon as it meets the wedge-shaped end of the block is moved laterally, compressing the spring 33, and putting the roller 32 of the controller in the path of movement of the extension E⁴, and by the time that the roller arrives in the position Fig. 36, the lever A⁷ has been turned for a greater distance than it is turned by the cam e⁸ in depressing the stock for feeding, and the work support, through the connections described, is put into its lowest position. During this operation the controller acting upon the block F forces it laterally in contact with the inner side of the fast pulley, so that the block performs also the functions of a brake. The movement of the controller into the position Fig. 37, effects the release of the loose pulley from the fast pulley, and stops the machine at a defined point with the stock support in its lowest position.

In some of the claims relating to the means for rendering the wire feeding mechanism operative or inoperative at the will of the workman I have specifically referred to a two row machine with means for rendering operative or inoperative the mechanism for feeding one of the wires. It should be understood, however, that my invention would be equally applicable to a machine for inserting a plurality of fastenings or slugs containing mechanism for rendering operative or inoperative, at the will of the workman, one or more of the wire feeding mechanisms, while allowing the mechanism for feeding the other wires to continue in operation; and the claims referred to are intended to cover such a machine.

Having fully described my invention, what I claim as new and desire to secure by Letters Patent is:—

1. In a machine of the class described, wire-feeding rolls, actuating mechanism therefor, adjustable shields to determine the extent of movement imparted to said rolls, and a manually controllable device for changing the position of one of said shields while the machine continues in operation to render operative or inoperative one of the feeding rolls whereby one or more rows of fastenings may be inserted at will without stopping the machine.

2. In a machine of the class described, wire feeding rolls, actuating mechanism therefor, a stud upon which said rolls are mounted, adjustable shields fulcrumed on said stud, one shield being located at the side of one feeding roll and the other shield at the side of the other feeding roll, and locking means for retaining said shields yieldingly in their adjusted positions.

3. In a machine of the class described, wire feeding rolls, pawls to actuate said rolls, shields for controlling the operation of said pawls and a manually controllable device for changing the position of one of said shields, while the machine continues in operation, to render operative or inoperative one of the feeding rolls, whereby the machine may be changed from one row to a plurality of rows or vice versa without stopping the machine.

4. In a machine of the class described, mechanism for forming and inserting fastenings from wire fed thereto, a wire feeding roll, a ratchet wheel connected therewith, a pawl to engage said ratchet wheel and actuate the feeding roll and a device for disengaging said pawl from the ratchet wheel at the end of its feeding stroke, adjustable to reduce the effective length of the feeding stroke to zero whereby the insertion of fastenings may be interrupted while the forming and inserting mechanism continues in operation.

5. In a machine of the class described, mechanism for forming and inserting fastenings from wire fed thereto, a wire feeding roll, a ratchet wheel connected therewith, a pawl to engage said ratchet wheel and actuate the feeding roll, said pawl being arranged to engage the ratchet wheel always at the same point, a device for disengaging said pawl at the end of the feeding stroke and means for controlling said device to vary the stroke of the feeding mechanism constructed and arranged to move said device into position to prevent engagement of the pawl with the ratchet wheel whereby the insertion of fastenings may be interrupted while the forming and inserting mechanism continues in operation.

6. In a machine of the class described the combination with mechanism for forming and inserting fastenings, a wire feeding roll for feeding into fastening forming position a length of wire, an actuating pawl normally in operative position and means for moving said pawl, of a pawl-sustaining shield movable between a position where it permits to said pawl a maximum roll-actuating stroke and a position where it permits to said pawl a zero roll-actuating stroke, a fixed locking plate, coöperating locking means carried by said shield and a manually controlled device connected to said shield to effect movement of the same whereby the length of the fastening may be determined or the feeding of the fastening may be entirely suspended.

7. In a machine of the class described, wire feeding means, a driver, means to actuate said driver, a block concaved at its underside and presenting an external vertical wall, the underside of said block having an open sided groove for the reception of the wire, the vertical face of said block having an open sided groove for the reception of the driver.

8. In a machine of the class described, wire feeding means, a curved block grooved at its concave side to guide said wire, and an adjustable saddle having a convex face to sustain the wire in its passage through said wire receiving groove.

9. In a machine of the class described, wire feeding means, a driver, means to actuate said driver, a block concaved at its under side and presenting an external vertical wall, the under side of said block having an open sided groove for the reception of the wire, the vertical face of said block having an open sided groove for the reception of the driver, a block having at its side a groove and meeting the said vertical face to complete the driver guiding passage, and means to hold said blocks in their operative relation.

10. In a machine of the class described, a driver bar a clamp having a cross groove and connected with the lower end of said bar, and a key slidable in said cross groove, and means to adjust said clamp to force the key into holding engagement with the driver.

11. In a machine of the class described, a plurality of drivers having each a notch at its lower side, a driver bar adapted to receive them, a clamp, a key sustained in said clamp, and means to secure the clamp to said bar and force one side of the key in clamping contact with the drivers, said key adapting itself to any variations in diameter of the shanks of the drivers.

12. In a machine of the class described, a driver bar having at its lower end a clamp grooved for the reception of a key, a key mounted in said clamp and having a convex side and a straight side, the convex side entering the groove of the clamp enabling the straight side of the key as it is forced into holding engagement with the drivers to adapt itself to variations in thickness of the drivers where held by the key.

13. In a machine of the class described, a driver bar, a uniformly reciprocated device to actuate the driver bar, and means to connect said device and said driver bar frictionally.

14. In a machine of the class described, a driver bar, a link, means to reciprocate the link, and means carried by the link and embracing the bar frictionally whereby on the occurrence of obstruction to the driver bar the latter may slip on or with relation to the moving link.

15. In a machine of the class described, a driver bar, a movable device to actuate the bar, a clamping sleeve and head carried by said device and contacting with one face of the driver bar, a threaded rod extended through said sleeve and having a block contacting with the opposite side of said driver bar, and means to cause said head and block to clamp said driver bar between them.

16. In a machine of the class described, wire feeding means, a curved block having grooves at its concave side to guide a plurality of wires, an adjustable saddle having a convex face to sustain the wires in their passage through said wire receiving grooves, a lever, and a cutter carried by said lever having a plurality of wire passages in direct communication with the wire grooves in said block, the wires leaving the block entering said wire passage and means to move said lever.

17. In a machine of the class described, a plurality of wire cutters composed each of two parts grooved at their contiguous faces for the reception of the drivers, one of the parts of one of said cutters having a separate passage for the wire whereby the part of said cutter having said separate wire passage may be readily removed when worn without change of the other part of said cutter.

18. In a machine of the class described, a shoe feeding device, a lever having a compensating device, means connecting said lever and feeding device and co-acting with said compensating device, means to actuate said lever and move the shoe feeding device laterally while in engagement with the stock, and means to control the extent of movement of said feeding device.

19. In a machine of the class described, a shoe feeding device having a stud, a lever having an opening provided with an inclined side to engage one side of said stud, means to adjust said feeding device longitudinally to determine the distance from the edge of the stock at which slugs or fastenings may be inserted, and means to actuate said lever to move the feeding device laterally, the inclined side of said slot insuring an equal spacing of the slugs or fastenings in the stock whatever the distance from the edge of the stock at which said slugs or fastenings are being driven into the stock.

20. In a machine of the class described, a shoe feeding device having a stud, means to control the extent of movement of said device a lever for moving said shoe feeding device laterally, said lever having an opening provided with an inclined side and with a compensating device against which said stud normally contacts, the movement of said lever bringing the inclined side of the slot against the stud and moving the feeding device laterally.

21. In a machine of the class described, a shoe feeding device, a fulcrum for said device, a carriage entered by the rear end of said device, adjustable means in said carriage to determine the distance that said feeding device shall enter said carriage, and means to reciprocate said carriage to move said feeding device longitudinally to engage the stock.

22. In a machine of the class described, a shoe feeding device, a fulcrum for said device, a carriage entered by the rear end of said device, adjustable means in said carriage to determine the distance that said feeding device shall enter said carriage, means to reciprocate said carriage to move said feeding device longitudinally to engage the stock, and means carried by said carriage for adjusting said feeding device to provide for the desired length of lateral feeding stroke and the spacing of the slugs or fastenings.

23. In a machine of the class described, a shoe feeding device, a fulcrum for said device, a carriage entered by the rear end of said device, adjustable means in said carriage to determine the distance that said feeding device shall enter said carriage, means to reciprocate said carriage to move said feeding device longitudinally to engage the stock, and means to move said feeding device laterally while in engagement with the stock.

24. In a machine of the class described, a shoe feeding device comprising a carriage, a feeding lever having its rear end entering said carriage, a loose block located in said carriage, means to move said block in said carriage, an eccentric plate, and means carried by said block moving device and co-acting with said eccentric plate whereby the latter may prevent any backward yielding of the feeding device while acting to feed the stock.

25. In a machine of the class described, a shoe feeding device comprising a lever pivoted near its inner end, a carriage located at the inner end of said device, means to move said carriage to cause said device to engage the shoe, a lever, means to move said lever for a uniform distance, and a stud between said device and lever to impart lateral feeding movement to the feeding device to feed the shoe.

26. In a machine of the class described, wire cutters, a shoe feeding device comprising a lever pivoted near its inner end, a carriage located at the inner end of said device, means to move said carriage to cause said device to engage the shoe, a lever carrying one of said wire cutters, means to move said lever for a uniform distance, and connections between said device and said lever wherethrough lateral feeding movement is imparted by the cutter carrying lever to the feeding device.

27. In a machine of the class described, a shoe feeding device having a stud, a lever for moving said shoe feeding device laterally, said lever having an opening provided with an inclined side and with a compensating device against which said stud normally contacts, a carriage having eccentric stops in the path of movement of said feeding device and means to move said carriage, the adjustment of said stops limiting the movement of said device and controlling the distance of the fastenings from the edge of the stock.

28. In a machine of the class described, a stationary cutter comprising two plates one of which has a hole to guide a wire, and a notch at its edge to form a part of a driver guide, the other plate having a notch to complete the driver-guide when the two plates are abutted edge to edge.

29. In a machine of the class described, a stationary cutter comprising two plates one of which has a hole to guide a wire, and a notch at its edge to form part of a driver-guide, the other plate having a notch to complete the driver guide when the two plates are abutted edge to edge, combined with a movable cutter comprising two plates notched at their abutting edges to constitute parts of a driver passage.

30. In a machine of the class described, a stationary cutter having a passage for a wire, and a driver passage, a cutter carrying lever having a slot and provided with a pocket, a second cutter sustained in said pocket, said second cutter having a driver passage, a nose plate located below said second cutter and having a driver passage, means to move said cutter-carrying lever, a work-feeding lever located adjacent said cutter carrying lever and having a stud entering said slot, said cutter carrying lever moving said work-feeding lever.

31. In a machine of the class described, a stationary cutter having a passage for a wire, and a driver passage, a cutter-carrying lever having a slot and provided with a pocket, a second cutter sustained in said pocket, said second cutter having a driver passage, a nose plate located below said second cutter and having a driver passage, means to move said cutter-carrying lever, a work-feeding lever located adjacent said cutter-carrying lever and having a stud entering said slot, said cutter-carrying lever moving said work-feeding lever, and means to move said work-feeding lever in the direction of its length to effect its engagement with or disengagement from the work.

32. In a machine of the class described, a stationary cutter having a passage for a wire, and a driver passage, a cutter-carrying lever having a slot and provided with a pocket, a second cutter sustained in said pocket, said second cutter having a driver passage, a nose plate located below said second cutter and having a driver passage, means to move said cutter-carrying lever, a work-feeding lever located adjacent said cutter-carrying lever and having a stud entering said slot, said cutter-carrying lever moving said work-feeding lever, and means co-acting with said work-feeding lever to vary the length of its work-feeding stroke.

33. In a machine of the class described, wire feeding rolls, independent actuating mechanism having a controllable effective actuating stroke for determining the extent of movement to be imparted to each of said rolls, and manually controllable means for reducing to zero the effective actuating stroke of one of said actuating mechanisms while the other of said mechanisms continues in operation.

34. In a machine of the class described, a plurality of wire feeding rolls, actuating mechanism for moving each roll, an adjustable shield co-acting with each roll for controlling from zero to a maximum the extent of movement of each roll by its actuating mechanism, and independent locking means for retaining each of said shields in its adjusted position.

35. In a machine of the class described, mechanism for forming and inserting fastenings from wire fed thereto, a wire feeding roll, actuating mechanism therefor and a device for disengaging the actuating mechanism at the end of the feeding stroke adjustable while the forming and inserting mechanism continues in operation to reduce the effective feeding stroke to zero and thereby interrupt the insertion of fastenings.

36. In a machine of the class described, mechanism for forming and inserting fastenings from wire fed thereto, a wire feeding roll, actuating mechanism therefor, a device for disengaging the actuating mechanism at the end of the feeding stroke and means for adjusting said device to vary the feeding stroke adjustable while the forming and inserting mechanism continues in operation to reduce the effective feeding stroke to zero and thereby interrupt the insertion of fastenings.

37. In a machine of the class described the combination with fastening-inserting mechanism and means for feeding various lengths of wire into position to form fastenings for said inserting mechanism, of normally operative actuating mechanism for said wire feeding means, and means constructed and arranged to control the amount of feeding movement imparted to said feeding means by its actuating mechanism between a maximum and zero whereby either the length of the fastening may be controlled, or the insertion of fastenings may be interrupted by reducing the amount of feeding movement imparted to the feeding means to zero.

38. In a machine of the class described, a wire cutter composed of two parts grooved at their contiguous faces for the reception of a driver, one of the parts of said cutter having a separate passage for the wire whereby said part may be readily removed when worn.

In testimony whereof, I have signed my name to this specification, in the presence of two subscribing witnesses.

GEO. A. AMBLER.

Witnesses:
JOHN C. EDWARDS,
MARGARET A. DUNN.